United States Patent
Niu et al.

(10) Patent No.: US 12,389,450 B2
(45) Date of Patent: Aug. 12, 2025

(54) METHODS OF SIGNALING DIRECTIONAL AND OMNI COT FOR FREQUENCIES BETWEEN 52.6 GHZ AND 71 GHZ

(71) Applicant: APPLE INC., Cupertino, CA (US)

(72) Inventors: Huaning Niu, San Jose, CA (US); Dawei Zhang, Saratoga, CA (US); Haitong Sun, Cupertino, CA (US); Hong He, San Jose, CA (US); Oghenekome Oteri, San Diego, CA (US); Wei Zeng, Saratoga, CA (US); Weidong Yang, San Diego, CA (US); Yushu Zhang, Beijing (CN)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/582,867

(22) Filed: Feb. 21, 2024

(65) Prior Publication Data
US 2024/0196434 A1   Jun. 13, 2024

Related U.S. Application Data

(63) Continuation of application No. 17/593,247, filed as application No. PCT/CN2021/085366 on Apr. 2, 2021, now Pat. No. 11,943,808.

(51) Int. Cl.
*H04W 74/0808* (2024.01)
*H04W 74/00* (2009.01)

(52) U.S. Cl.
CPC ..... *H04W 74/0808* (2013.01); *H04W 74/006* (2013.01)

(58) Field of Classification Search
CPC . H04W 36/0061; H04W 48/14; H04W 48/16; H04W 74/0808

USPC .................................................. 370/329, 331
See application file for complete search history.

(56) References Cited

U.S. PATENT DOCUMENTS

| | | |
|---|---|---|
| 11,290,235 B2 | 3/2022 | Noh et al. |
| 11,582,004 B2 | 2/2023 | Noh et al. |
| 11,723,042 B2 | 8/2023 | Bang et al. |
| 11,765,705 B2 | 9/2023 | Abotabl et al. |
| 11,943,808 B2 * | 3/2024 | Niu .................. H04W 74/0808 |

(Continued)

FOREIGN PATENT DOCUMENTS

| | | |
|---|---|---|
| CN | 110536453 A | 12/2019 |
| CN | 111316739 A | 6/2020 |

(Continued)

OTHER PUBLICATIONS

"Methods and Apparatus for LTE Single Cell Point to Multipoint Transmission (SC-PTM) Operations" An IP.com Prior Art Database Technical Disclosure Authors et al.: Disclosed Without Attribution Dec. 22, 2017 (Year: 2017).*

(Continued)

*Primary Examiner* — William D Cumming
(74) *Attorney, Agent, or Firm* — Dorsey & Whitney LLP

(57) ABSTRACT

A wireless communication system may use higher layer signaling to send transmission configuration indicator (TCI) parameters for a frequency band comprising the 52.6 GHz to 71 GHz range. A DCI message may be used to indicate an enabled TCI state for a channel occupancy time (COT). The wireless communication system may apply the enabled TCI state for the COT as indicated in the DCI message.

17 Claims, 8 Drawing Sheets

(56) References Cited

U.S. PATENT DOCUMENTS

| | | | |
|---|---|---|---|
| 2014/0376515 A1* | 12/2014 | Lei | H04W 36/0061 |
| | | | 370/331 |
| 2019/0141693 A1 | 5/2019 | Guo | |
| 2020/0267734 A1 | 8/2020 | Khoshnevisan et al. | |
| 2020/0280971 A1 | 9/2020 | Moon et al. | |
| 2021/0050976 A1 | 2/2021 | Noh et al. | |
| 2021/0329608 A1 | 10/2021 | Bang et al. | |
| 2022/0086911 A1 | 3/2022 | Oh et al. | |
| 2022/0131645 A1 | 4/2022 | Miao | |
| 2022/0224476 A1 | 7/2022 | Noh et al. | |
| 2023/0101279 A1* | 3/2023 | Niu | H04W 74/0808 |
| | | | 370/329 |
| 2023/0130264 A1 | 4/2023 | Niu et al. | |
| 2023/0155659 A1 | 5/2023 | Ganesan et al. | |
| 2024/0032095 A1* | 1/2024 | Chen | H04W 48/14 |
| 2024/0057159 A1* | 2/2024 | Calcev | H04W 48/16 |
| 2024/0196434 A1* | 6/2024 | Niu | H04W 74/0808 |

FOREIGN PATENT DOCUMENTS

| | | | |
|---|---|---|---|
| CN | 112398615 A | | 2/2021 |
| CN | 112567826 A | | 3/2021 |
| CN | 115209543 A | * | 10/2022 |
| CN | 116965103 A | * | 10/2023 |
| CN | 117460075 A | * | 1/2024 |
| WO | WO-2013120274 A1 | * | 8/2013 |
| WO | 2020030983 A1 | | 2/2020 |
| WO | 2020231832 A1 | | 11/2020 |
| WO | WO-2022115883 A2 | * | 6/2022 |
| WO | 2022203378 A1 | | 9/2022 |
| WO | WO-2023132559 A1 | * | 7/2023 |

OTHER PUBLICATIONS

Nokia, Nokia Shanghai Bell, "Beam Management Aspects", R1-2100260, 3GPP TSG RAN WG1 #104, e-Meeting, Agenda Item 8.2.4, Jan. 25-Feb. 5, 2021, 7 pages.

U.S. Appl. No. 17/593,247, Notice of Allowance, Nov. 9, 2023, 22 pages.

NTT DOCOMO, "TCI state for PDCCH", R1-1807839, 3GPP TSG RAN WG1 Meeting #93, Busan, South Korea, Agenda Item 7.1.3.1.2, May 21-25, 2018, 2 pages.

PCT/CN2021/085366, International Search Report and Written Opinion, Jan. 5, 2022, 8 pages.

Qualcomm Incorporated, "RRM Requirements for active TCI state switch", R4-1811286, 3GPP TAN4#88, Gothenburg, Sweden, Agenda Item 5.2.8.4—BWP switching[NR_newRAT-Core], Aug. 20-24, 2018, 2 pages.

Takeda, Kazuki, et al., "Understanding the Heart of the 5G Air Interface: An Overview of Physical Downlink Control Channel for 5G New Radio", IEEE Communications Standards Magazine, vol. 4, No. 3, Sep. 2020, pp. 22-29.

Lenovo, Motorola Mobility, "Channel access mechanisms for NR from 52.6 GHz to 71GHz", R1-2100062, 3GPP TSG RAN WG1 #104-e, e-Meeting, Agenda Item 8.2.6, Jan. 25-Feb. 5, 2021, 16 pages.

* cited by examiner

US 12,389,450 B2

METHODS OF SIGNALING DIRECTIONAL AND OMNI COT FOR FREQUENCIES BETWEEN 52.6 GHZ AND 71 GHZ

TECHNICAL FIELD

This application relates generally to wireless communication systems, including an indication of a transmission configuration indicator (TCI) state for a channel occupancy time (COT).

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE) (e.g., 4G) or new radio (NR) (e.g., 5G); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANS, RAN Nodes can include a 5G Node, NR node (also referred to as a next generation Node B or g Node B (gNB)).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, the E-UTRAN implements LTE RAT, and NG-RAN implements 5G RAT. In certain deployments, the E-UTRAN may also implement 5G RAT.

Frequency bands for 5G NR may be separated into two different frequency ranges. Frequency Range 1 (FR1) may include frequency bands operating in sub-6 GHz frequencies, some of which are bands that may be used by previous standards, and may potentially be extended to cover new spectrum offerings from 410 MHz to 7125 MHz. Frequency Range 2 (FR2) may include frequency bands from 24.25 GHz to 52.6 GHz. Bands in the millimeter wave (mmWave) range of FR2 may have smaller coverage but potentially higher available bandwidth than bands in the FR1. Skilled persons will recognize these frequency ranges, which are provided by way of example, may change from time to time or from region to region.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Frequencies outside of traditional new radio (NR) frequencies (e.g., outside of FR1 and FR2) may be of interest to implementers of NR equipment. For example, frequencies between 52.6 GHz and 71 GHz may be of interest due to their proximity to 52.6 GHz (the FR2 upper bound) and/or because of the unlicensed nature of at least some of this spectrum (e.g., between 57 GHz and 71 GHZ). These (or other) frequencies may be used to establish/host one or more channels (e.g., a bandwidth which can be used for signaling between devices) according to the transmission abilities of a wireless transmission system.

Accordingly, a channel access mechanism for accessing/establishing channels this (or another) range of frequencies outside of FR1 and FR2 may be defined to allow implementers of NR equipment to configure their NR devices to use channels within this (or another) range of frequencies. For example, in some embodiments, the channel access mechanism may assume a beam based operation in order to comply with the regulatory requirements. For example, a channel access mechanism may be used to control access to, for example, a channel that is in the 52.6 GHz to 71 GHz range (or another range). This channel access mechanism may be configured to comply with regulatory requirements applicable to any unlicensed spectrum within this frequency range. The channel access mechanism may be specified for both listen before talk (LBT) and no-LBT related procedures. For the no-LBT case, no additional sensing mechanism may be specified. In some countries LBT procedures are mandated. In other countries there may not be an LBT mandate. Thus, both LBT and no-LBT should be supported.

Further, it is anticipated that in NR systems, in many cases, a transmission may use multiple transmit (Tx) antennas. The multiple antennas may be used for omni-directional or directional beams. Thus, there is a need to specify whether the NR system is using omni-directional LBT or directional LBT.

A NR system may provide transmission information via a plurality of methods. A Downlink Control Information (DCI) message is one way in which the NR system may provide information to a user equipment (UE). For example, a DCI format 2-0 may be used to indicate a slot format, indicate available resource block (RB) set, indicate channel occupancy time (COT) duration, and indicate a search space for UE power saving. Some embodiments herein expand the DCI format 2-0 to provide a Transmission Configuration Indicator (TCI) state indication. Additionally, embodiments herein may use higher level signaling, such as a system information block (SIB) message sent via radio resource control (RRC) signaling, to configure a TCI state indication parameter.

Figure 1:
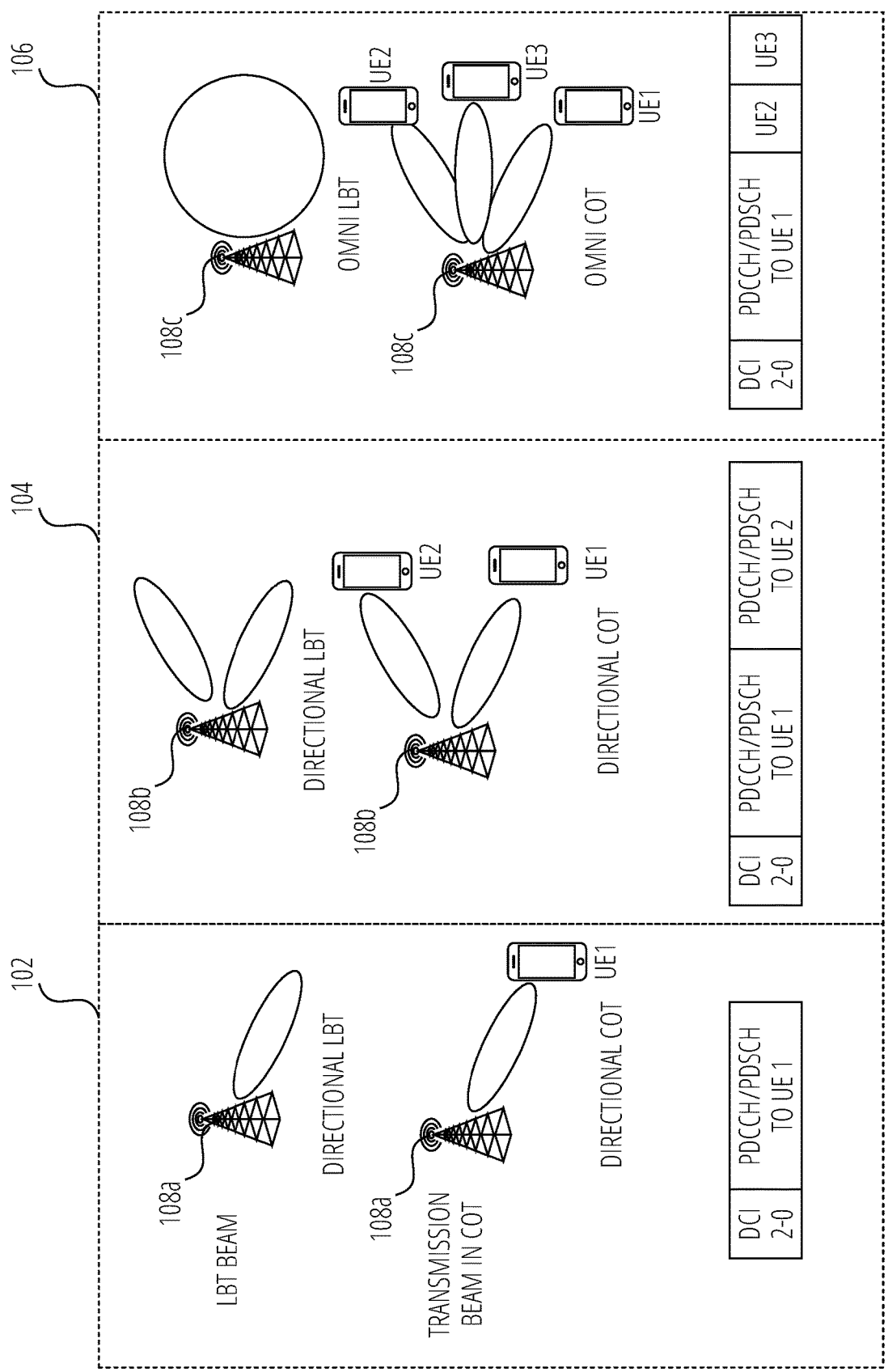
FIG. 1 illustrates a base station performing directional LBT and Omni LBT in accordance with one embodiment.

FIG. 1 illustrates a base station (e.g., network node 108a, 108b, and 108c) performing directional LBT and Omni LBT. In some embodiments, the LBT beam and transmission beam are explicitly associated. When (quasi)-omni-LBT is used for sensing, transmission can be any direction. When directional LBT is used for sensing, transmission beam should be linked to the LBT beam. While FIG. 1 illustrates a downlink channel transmission, if granted an uplink transmission COT may also be allocated.

In the single direction scenario 102, the network node 108a performs a directional LBT process in relation to a transmission to a UE on the intended transmission beam. Once the directional LBT process is performed, the network node 108a acquires the channel in the direction of the intended transmission beam for a COT. In other words, the network node 108a may limit its use of the channel attendant to this channel acquisition to the use of the intended transmission beam during the COT. After the network node 108a uses a directional LBT to acquire the channel in the direction of the intended transmission beam for a COT, the base station 202 may use the COT to perform one or more transmissions to the UE on the intended Tx beam.

Similarly, in the multiple direction scenario 104 may use directional LBT in multiple directions in relation to transmissions to multiple UEs on multiple (respective) intended transmission beams. In one embodiment according, the network node 108b performs a directional LBT in relation to both a transmission to a first UE on the first intended transmission beam and a transmission to a second UE on the second intended Tx beam. After the network node 108b uses a directional LBT to acquire the channel in the direction of the first intended transmission beam and the second intended Tx beam for a COT, the network node 108b may use the COT to perform one or more transmissions to the first UE and the second UE.

Additionally, the network node 108c may use the omni scenario 106 to perform an omni LBT process to communicate to multiple UE via an associated omni COT. After the network node 108c uses an omni LBT to acquire the channels of the intended transmission beam for a COT, the base station 202 may use the COT to perform one or more transmissions to the UEs on the intended Tx beams.

Figure 2:
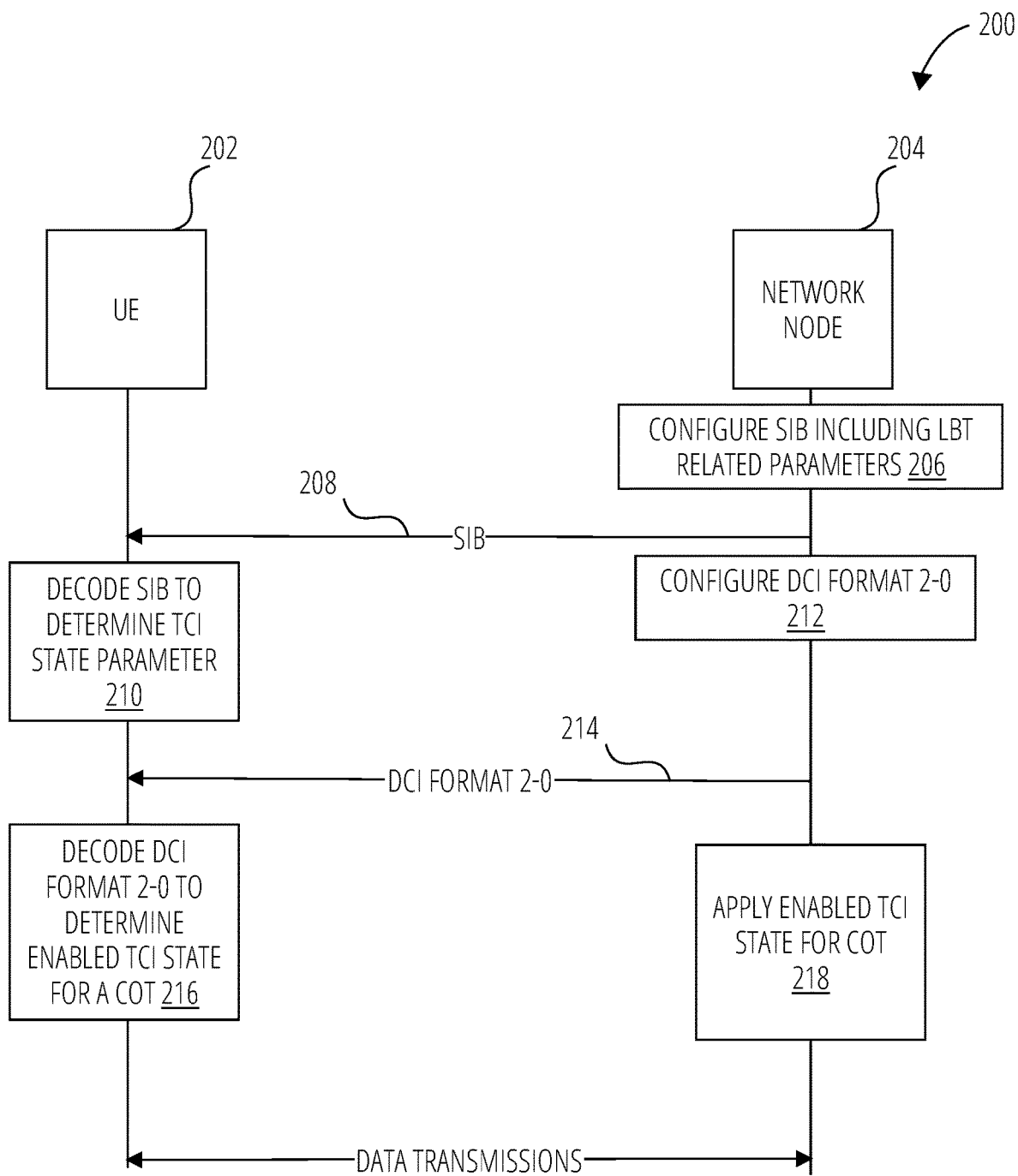
FIG. 2 is a simplified signal flow diagram for determining a TCI state for a COT in the 52.6 GHz to 71 GHz range, in accordance with one embodiment.

FIG. 2 is a simplified signal flow diagram 200 for determining a TCI state for a COT in the 52.6 GHz to 71 GHz range. The network node 204 may use higher layer signaling, such as RRC signaling, and DCI messages to configure a TCI state for a COT.

In the illustrated embodiment, the network node 204 configures 206 a SIB to provide information to the UE 202. The SIB may include LBT related parameters. For example, the network node 204 may set up LBT related parameters in an LBT configuration element. In some embodiments, the LBT configuration element may be named lbt-ConfigCommon. The LBT configuration element lbt-ConfigCommon may include a number of LBT related parameters. The LBT configuration element may include a parameter that indicates whether LBT or no LBT may be used. This parameter may depend on local regulations. The LBT configuration element may also include a parameter that indicates an LBT type. For example, the LBT type parameter may indicate whether to use directional, omni, or combination of both for LBT. Additionally, the LBT type parameter may indicate if receiver assisted is enabled or not.

The LBT configuration element may also include parameters related to an LBT beam TCI state. For example, the TCI state information parameters may include a maximum LBT beam value. For example, the parameters may indicate that eight or four beams will be used depending on how wide the LBT beam will be. The parameters may also include a TCI state identifier and a Quasi co-location (QCL) type. The QCL type may be type A, type D, or both type A and type D. Additionally, the parameters may indicate a reference signal association (e.g., Synchronization Signal Block (SSB) or Channel-State Information reference signal (CSI-RS)). The mapping between the LBT beams and the reference signal may be one to one or one to many. In some embodiments, the TCI state can be the sensing beam TCI state, and the UE may derive a transmission TCI state of the COT based on an RRC configured sensing beam to transmission beam mapping. In some embodiments, the TCI state may be the transmission beam TCI state.

In some embodiments, if the LBT configuration element is not configured in the SIB, the UE 202 and the network node 204 may use a default value. For example, in some embodiments the default value may correspond to omni LBT. In some embodiments, the LBT configuration can be transmitted using UE specific RRC message, e.g., lbt-ConfigDedicated.

The network node 204 may transmit 208 the SIB to the UE 202. When the UE 202 receives the SIB, the UE 202 may decode 210 the SIB to determine the LBT related parameters including the TCI state parameter.

The network node 204 may configure 212 a DCI message such as a DCI Format 2-0. The DCI message indicating an enabled TCI state for a channel occupancy time (COT). The network node 204 may configure the DCI message to indicate the TCI state using a bit field. In some embodiments, if the default is omni sensing and if omni sensing is configured, there may be no bit field in the DCI message.

If directional LBT is configured in SIB (e.g., lbt-ConfigCommon is configured) the network node 204 may configure the DCI message to indicate the TCI state. The DCI message may enable a bit field of maximum sensing TCI State enabled. The length of the bit field may correspond to the number of TCI states and indicate the enabled TCI states. In other words, which LBT beam direction is used in a sensing period, the corresponding TCI State may be indicated for this COT using the bit field. When used together with a unified TCI State framework, the indicated COT TCI State may be applied to Physical Downlink Control Channel (PDCCH), Physical Downlink Shared Channel (PDSCH), Physical Uplink Control Channel (PUCCH), Physical Uplink Shared Channel (PUSCH), and CSI-RS/Sounding Reference Signal (SRS). In some embodiments, if only one TCI is activated by higher layer signaling (e.g., SIB), UE 202 may apply the TCI directly and TCI in DCI may not be present.

If both directional LBT and omni LBT are configured in SIB, (e.g., configured in lbt-ConfigCommon), the network node 204 may enable a bit field in the DCI message for the maximum TCI state plus another one bit for omni LBT. In some embodiments, one default value of TCI in the bit field of the DCI may indicate omni LBT. In some embodiments, if omni sensing is performed before the COT, omni LBT bit may be set to 1, and the other bit field for directional LBT may be ignored. In some embodiments, if directional sensing is performed before the COT, omni LBT bit may be set to zero and the LBT beam corresponding the TCI bit in the bit field for directional LBT is set to 1.

In some embodiments, a medium access control element (MAC CE) can be used to enable the LBT configuration signaled in SIB. In some embodiments the MAC CE may be used in place of the DCI message. In other embodiments, the network node 204 may use a combination of the DCI format and the MAC CE to enable the LBT configuration signaled in SIB.

The TCI state signaled in the DCI message may be used to indirectly or directly indicate the transmission beam. For example, in one embodiment, the DCI message can indicate an LBT beam (sensing beam direction) and the UE 202 may derive transmission beam by associated sensing beam to reference signal association. Thus, the UE 202 may determine the transmission beam direction indirectly. In another embodiment, the DCI message can directly indicate the transmission beam TCI state.

The UE 202 may decode 216 the DCI message and determine the enabled TCI state for the COT. The network node 204 may enable 218 the TCI state for the COT to facilitate data transmissions.

The DCI message (e.g., DCI format 2-0) may also be applied to LBT in multiple component carriers (CCs) in the 52.6 GHz to 71 GHz range. To send the DCI message, a clear channel assessment (CCA) may be performed. The CCA may be used to determine whether to allow the wireless transmission system to access the channel. Generally, if the wireless transmission system finds an Operating Channel occupied, the network may not transmit in that channel and it shall not enable other equipment(s) to transmit in that channel. Conversely, the wireless transmission system may use the CCs if it is determined that the CCs are not occupied.

The LBT procedure for CCA on multiple CCs may be one of two types. Accordingly, the bit field indicating TCI state of the DCI message may be different based on the type of LBT procedure. A first type of LBT procedure may be supported by the bit field 300a in FIG. 3A and a second type of LBT procedure may be supported by the bit field 300b in FIG. 3B.

Figure 3A:
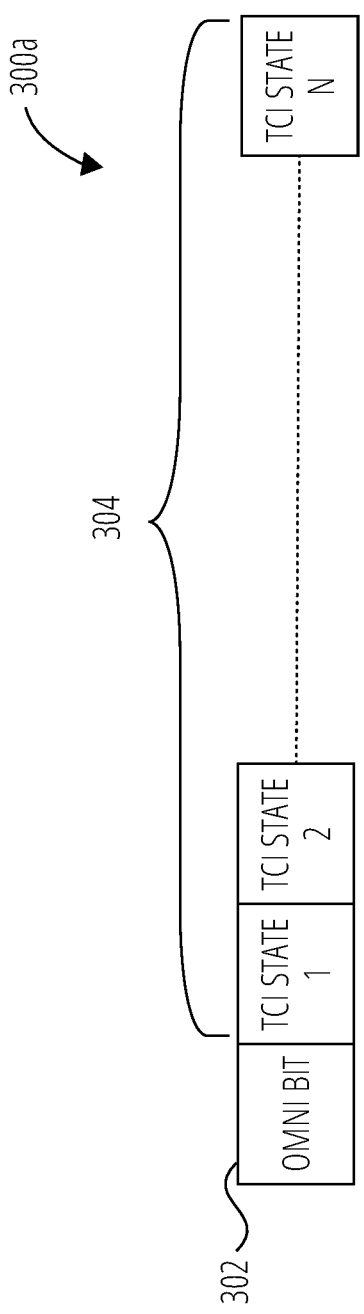
FIG. 3A illustrates a bit field that may be used in a DCI for type one LBT in multiple CCs in accordance with one embodiment.

FIG. 3A illustrates a bit field 300a that may be used in a DCI for type one LBT in multiple CCs. In type one, the network node picks one random CC of the multiple CCs and then performs the LBT procedure for CCA on that one random CC. If the random CC is determined to be clear, transmission on all of the multiple CCs can proceed after one shot LBT on other CC. Accordingly, the network node may configure and transmit a DCI message (e.g., DCI Format 2-0).

The DCI message may be sent in any of the CCs. For example, the DCI message may be sent in the random CC that succeeded the LBT CCA procedure. The DCI message may indicate a COT TCI state (omni or directional) to apply to all the CCs. For example, a DCI format 2-0 message may include the bit field 300a indicating the TCI state. The bit field may include an omni bit 302 and bits associated with each potential TCI state configured in an SIB. The bits in the bit field 300a may indicate what COT TCI state is enabled. The COT TCI state enabled by the bit field 300a may be applied to all the CCs not just the CC that the DCI message is sent in.

For this first type of LBT procedure, a UE receiving a DCI message including the bit field 300a may decode the DCI message to determine the TCI state indicated in the bit field 300a. If directional LBT is enabled and the TCI state indicated by the DCI message is not included in UE's active TCI state list as configured by a SIB via RRC signaling, the UE can skip monitoring the COT for UE power saving. The UE may also freeze an LBT counter to avoid contending radio resource and cause interference to the network node. For example, the UE may set network allocation vector (NAV) timers.

In some embodiments, when multiple band groups are configured, a similar LBT procedure may be performed. For example, a random CC can be chosen from a CC list configured by higher layer signaling. A random CC may be chosen per band or band group. If the random CC is clear than all the CCs within the band can be used for transmission. The DCI message including the bit field 300a may be used to indicate an enabled COT TCI state (omni or directional) for all of the CCs, the CCs in a band, or the CCs in a band group.

Figure 3B:
FIG. 3B illustrates a bit field that may be used in a DCI for type two LBT in multiple CCs in accordance with one embodiment.

FIG. 3B illustrates a bit field 300b that may be used in a DCI for type two LBT in multiple CCs. In type two, the network node performs the LBT CCA procedure independently. This may result in different combinations of LBT beams based on which CC are determined to be clear and not clear.

In some embodiments, the network node may send a DCI message comprising the TCI state indication in every CC that succeeds the LBT CCA procedure. Each DCI message may be individualized for a specific CC. Accordingly, the TCI state indication in the DCI message would apply only to the associated CC. A bit field similar to the bit field 300a in FIG. 3B may be used and sent in every CC.

In other embodiments, the DCI message may be sent to one CC of the CCs that are cleared. The DCI message may define a cell group listing and a TCI state indication for each cell group. For example, the DCI message may include a bit field 300b that includes TCI state bits and an omni bit for each Scell group.

For this second type of LBT procedure, a UE receiving the DCI message may monitor the corresponding CC with either omni LBT or TCI State indicated by the DCI message as included in UE's active TCI State list. Additionally, the UE may set NAV timers.

In some embodiments, the TCI state procedures discussed herein may be applied to multiple transmission and reception points (mTRP) enabled wireless communication systems. When mTRP is enabled in the frequency band of 52.6 GHz to 71 GHz range, CCA sensing procedure in mTRP may be one of two types. A first type of CCA sensing for mTRP may randomly choose one transmission and reception point (TRP) and perform the CCA LBT procedure. Upon finishing the CCA LBT procedure in one TRP transmission from each of the TRPs can start. This first type of CCA sensing may only apply to omni LBT.

A second CCA sensing type for mTRP may include performing the CCA LBT procedure on each of the TRPs. The mTRP enabled system can coordinate the starting time of the CCA LBT procedure and the random number of slots used for sensing. If the CCA LBT procedures for both mTRP finish the at the same time, a DCI message (e.g., DCI Format 2-0) may be used to signal the TCI State used in LBT sensing for both TRP. The network can freeze the LBT counter if one or both TRP is busy, to ensure synchronized mTRP transmission. Async mTRP may not supported in certain MIMO design. If one TRP start transmission and the other TRP is still in the LBT procedure, COT may not be initiated independently from the other TRP.

Figure 4:
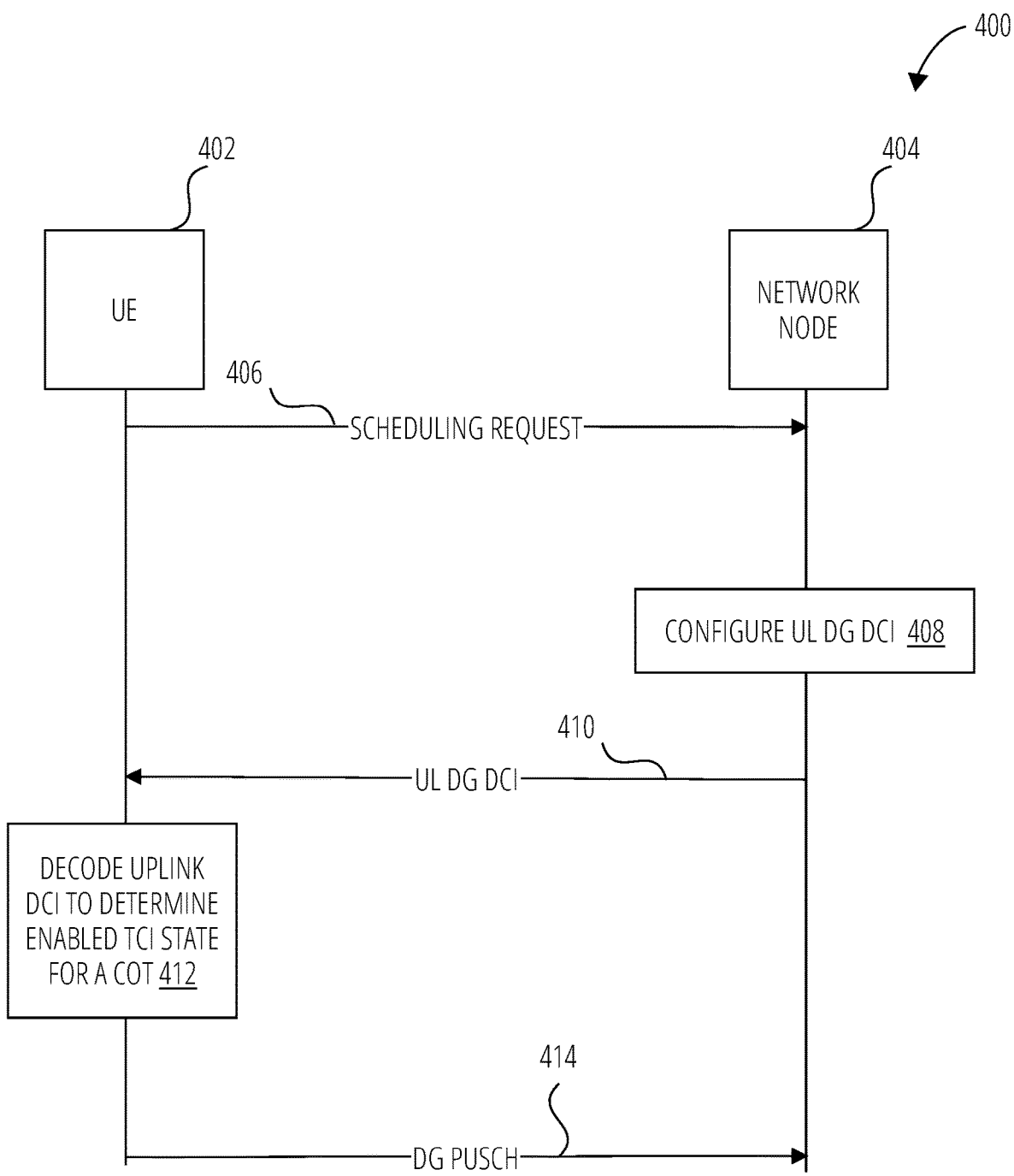
FIG. 4 is a simplified signal flow diagram for determining a TCI state for an uplink (UL) COT in the 52.6 GHz to 71 GHz range for uplink dynamic grant (DG) transmission in accordance with one embodiment.

FIG. 4 is a simplified signal flow diagram 400 for determining a TCI state for an uplink (UL) COT in the 52.6 GHz to 71 GHz range for uplink dynamic grant (DG) transmission. As shown, the UE 402 transmits a scheduling request 406 to the network node 404. The network node 404 may configure 408 an uplink DCI 410. The UL DCI can explicitly indicate a sensing beam (directional or omni) for the DG PUSCH 414. For example, the uplink DCI 410 may include a new bit indicating the sensing beam. The UE may decode 412 the UL DCI to determine a TCI state for the UL COT. If the sensing beam is explicitly indicated, the UE 402 uses the indicated beam to transmit the DG PUSCH 414. If the bit is not configured in the UL DCI 410, the UE 402 may cause the UL COT beam sensing to follow a current active TCI state used in beam management.

Figure 5:
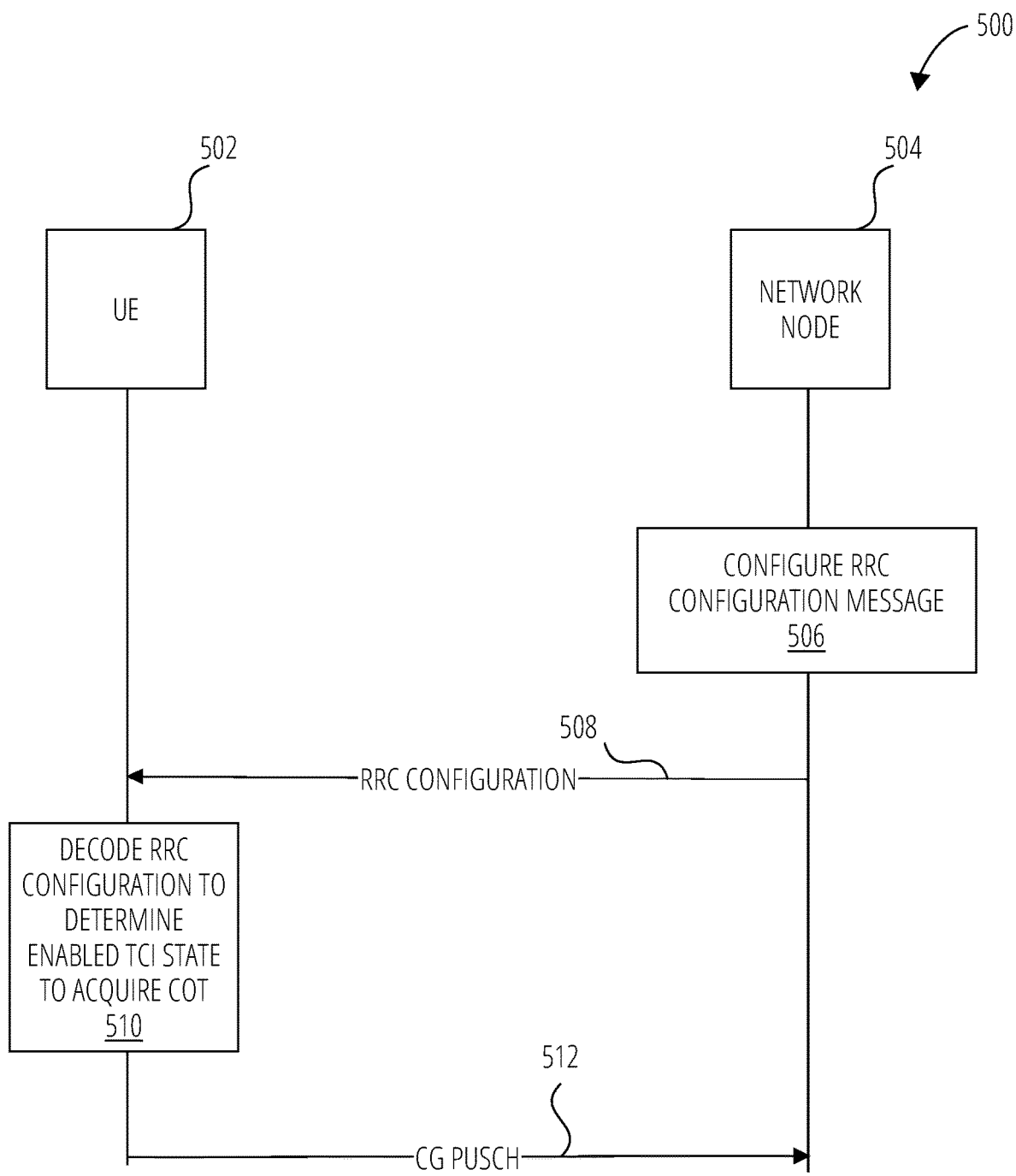
FIG. 5 is a simplified signal flow diagram for determining a TCI state for an uplink (UL) COT in the 52.6 GHz to 71 GHz range for UL configured grant (CG) transmission, in accordance with one embodiment.

FIG. 5 is a simplified signal flow diagram 500 for determining a TCI state for an uplink (UL) COT in the 52.6 GHz to 71 GHz range for UL configured grant (CG) transmission. As shown, the network node 504 may configure 506 and transmit 508 to the UE 502 an RRC configuration message. The RRC configuration message for CG (e.g., ConfiguredGrantConfig) may indicate whether the UE 502 is to perform directional LBT, omni LBT, or if it is up to the UE to acquire CG COT. The UE 502 may decode 510 the RRC configuration message to determine the TCI state. If the RRC configuration message indicates that a directional LBT, UE 502 may perform directional LBT with specific Effective Isotropic Radiated Power (EIRP) and beam direction for the transmission burst, using current active TCI State indicated in the RRC configuration message. If the RRC configuration message indicates omni LBT, the UE 502 may perform omni LBT. Omni LBT may be a default such that if directional LBT is not indicated in the RRC configuration, the UE performs omni LBT.

In some embodiments, the sensing beam and/or transmission beam direction may be signaled via a CG-Uplink Control Information (UCI). The UE may transmit 512 the CG-UCI on a CG PUSCH. The CG-UCI content may include HARQ ID, new data indicator (NDI), redundancy version (RV), and COT sharing information. The COT sharing information may include COT duration and offset, and a TCI state. The network node 504 may share the COT sharing information in the CG-UCI for PDCCH/PDSCH transmission within the TCI State.

Figure 6:
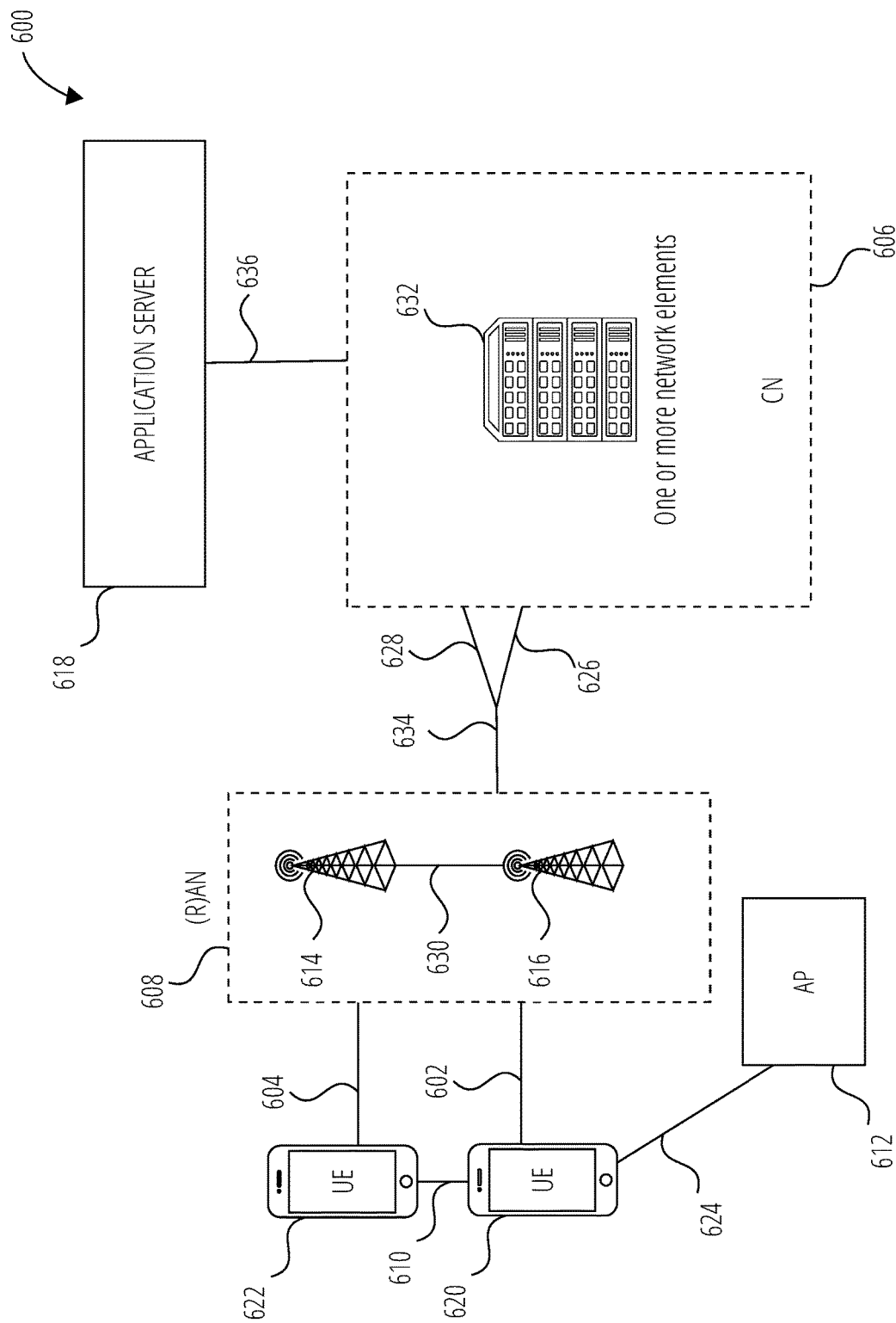
FIG. 6 illustrates a system in accordance with one embodiment.

FIG. 6 illustrates an example architecture of a system 600 of a network, in accordance with various embodiments. The following description is provided for an example system 600 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 6, the system 600 includes UE 622 and UE 620. In this example, the UE 622 and the UE 620 are illustrated as smartphones (e.g., handheld touchscreen mobile computing devices connectable to one or more cellular networks), but may also comprise any mobile or non-mobile computing device. In some embodiments, the UE 622 and/or the UE 620 may be IoT UEs, which may comprise a network access layer designed for low power IoT applications utilizing short-lived UE connections.

The UE 622 and UE 620 may be configured to connect, for example, communicatively couple, with an access node or radio access node (shown as (R)AN 608). In embodiments, the (R)AN 608 may be an NG RAN or a 5G RAN, an E-UTRAN, or a legacy RAN, such as a UTRAN or GERAN. As used herein, the term "NG RAN" or the like may refer to a (R)AN 608 that operates in an NR or 5G system, and the term "E-UTRAN" or the like may refer to a (R)AN 608 that operates in an LTE or 4G system. The UE 622 and UE 620 utilize connections (or channels) (shown as connection 604 and connection 602, respectively), each of which comprises a physical communications interface or layer (discussed in further detail below).

In this example, the connection 604 and connection 602 are air interfaces to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein. In embodiments, the UE 622 and UE 620 may directly exchange communication data via a ProSe interface 610. The ProSe interface 610 may alternatively be referred to as a sidelink (SL) interface 110 and may comprise one or more logical channels, including but not limited to a PSCCH, a PSSCH, a PSDCH, and a PSBCH.

The UE 620 is shown to be configured to access an AP 612 (also referred to as "WLAN node," "WLAN," "WLAN Termination," "WT" or the like) via connection 624. The connection 624 can comprise a local wireless connection, such as a connection consistent with any IEEE 802.11 protocol, wherein the AP 612 would comprise a wireless fidelity (Wi-Fi®) router. In this example, the AP 612 may be connected to the Internet without connecting to the core network of the wireless system (described in further detail below).

The (R)AN 608 can include one or more AN nodes, such as RAN node 614 and RAN node 616, that enable the connection 604 and connection 602. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node that operates in an NR or 5G system (for example, a gNB), and the term "E-UTRAN node" or the like may refer to a RAN node that operates in an LTE or 4G system 600 (e.g., an eNB). According to various embodiments, the RAN node 614 or RAN node 616 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

According to various embodiments, the UE 622 and UE 620 and the RAN node 614 and/or the RAN node 616 communicate data (for example, transmit and receive) over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHZ, whereas the unlicensed spectrum may include the 5 GHz band.

To operate in the unlicensed spectrum, the UE 622 and UE 620 and the RAN node 614 or RAN node 616 may operate using LAA, cLAA, and/or feLAA mechanisms. In these implementations, the UE 622 and UE 620 and the RAN node 614 or RAN node 616 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UE 622 and UE 620, RAN node 614 or RAN node 616, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA Here, when a WLAN node (e.g., a mobile station (MS) such as UE 622, AP 612, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (μs); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 622 to undergo a handover. In LAA, cLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UE 622 and UE 620. The PDCCH carries information about the transport format and resource allocations related to the PDSCH channel, among other things. It may also inform the UE 622 and UE 620 about the transport format, resource allocation, and HARQ information related to the uplink shared channel. Typically, downlink scheduling (assigning control and shared channel resource blocks to the UE 620 within a cell) may be performed at any of the RAN node 614 or RAN node 616 based on channel quality information fed back from any of the UE 622 and UE 620. The downlink resource assignment information may be sent on the PDCCH used for (e.g., assigned to) each of the UE 622 and UE 620.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as EREGs. An ECCE may have other numbers of EREGs in some situations.

The RAN node 614 or RAN node 616 may be configured to communicate with one another via interface 630.

In embodiments where the system 600 is a 5G or NR system (e.g., when CN 606 is an 5GC), the interface 630 may be an Xn interface. The Xn interface is defined between two or more RAN nodes (e.g., two or more gNBs and the like) that connect to 5GC, between a RAN node 614 (e.g., a gNB) connecting to 5GC and an eNB, and/or between two eNBs connecting to 5GC (e.g., CN 606). In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 622 in a connected mode (e.g., CM-CONNECTED) including functionality to manage the UE mobility for connected mode between one or more RAN node 614 or RAN node 616. The mobility support may include context transfer from an old (source) serving RAN node 614 to new (target) serving RAN node 616; and control of user plane tunnels between old (source) serving RAN node 614 to new (target) serving RAN node 616. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The (R)AN 608 is shown to be communicatively coupled to a core network-in this embodiment, CN 606. The CN 606 may comprise one or more network elements 632, which are configured to offer various data and telecommunications services to customers/subscribers (e.g., users of UE 622 and UE 620) who are connected to the CN 606 via the (R)AN 608. The components of the CN 606 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 606 may be referred to as a network slice, and a logical instantiation of a portion of the CN 606 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, an application server 618 may be an element offering applications that use IP bearer resources with the core network (e.g., UMTS PS domain, LTE PS data services, etc.). The application server 618 can also be configured to support one or more communication services (e.g., VOIP sessions, PTT sessions, group communication sessions, social networking services, etc.) for the UE 622 and UE 620 via the EPC. The application server 618 may communicate with the CN 606 through an IP communications interface 636.

In embodiments, the CN 606 may be an SGC, and the (R)AN 116 may be connected with the CN 606 via an NG interface 634. In embodiments, the NG interface 634 may be split into two parts, an NG user plane (NG-U) interface 626, which carries traffic data between the RAN node 614 or RAN node 616 and a UPF, and the S1 control plane (NG-C) interface 628, which is a signaling interface between the RAN node 614 or RAN node 616 and AMFs.

In embodiments, the CN 606 may be a SG CN, while in other embodiments, the CN 606 may be an EPC). Where CN 606 is an EPC, the (R)AN 116 may be connected with the CN 606 via an S1 interface 634. In embodiments, the S1 interface 634 may be split into two parts, an S1 user plane (S1-U) interface 626, which carries traffic data between the RAN node 614 or RAN node 616 and the S-GW, and the S1-MME interface 628, which is a signaling interface between the RAN node 614 or RAN node 616 and MMEs.

Figure 7:
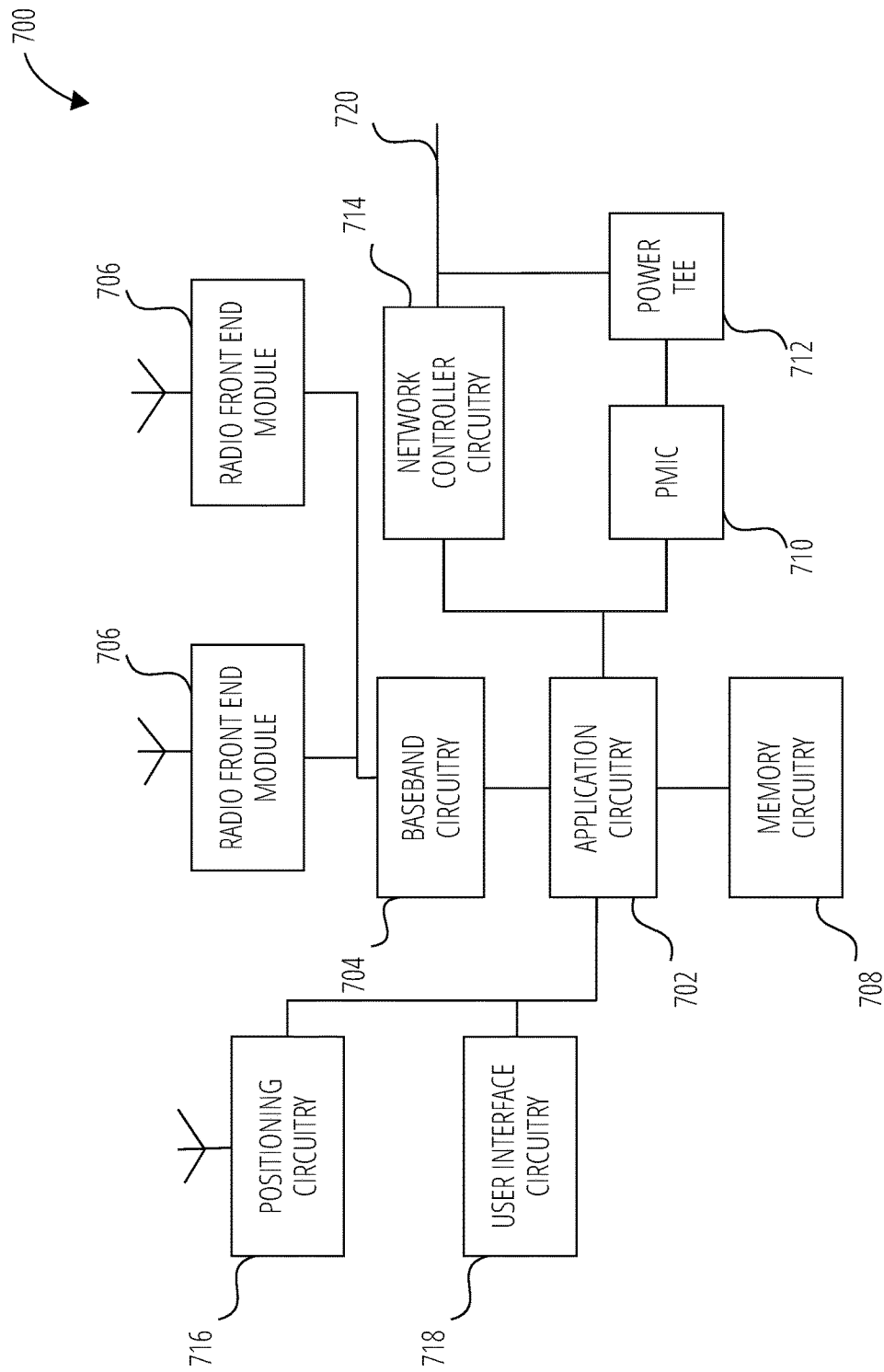
FIG. 7 illustrates an infrastructure equipment in accordance with one embodiment.

FIG. 7 illustrates an example of infrastructure equipment 700 in accordance with various embodiments. The infrastructure equipment 700 may be implemented as a base station, radio head, RAN node, AN, application server, and/or any other element/device discussed herein. In other examples, the infrastructure equipment 700 could be implemented in or by a UE.

The infrastructure equipment 700 includes application circuitry 702, baseband circuitry 704, one or more radio front end module 706 (RFEM), memory circuitry 708, power management integrated circuitry (shown as PMIC 710), power tee circuitry 712, network controller circuitry 714, network interface connector 720, satellite positioning circuitry 716, and user interface circuitry 718. In some embodiments, the device infrastructure equipment 700 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations. Application circuitry 702 includes circuitry such as, but not limited to one or more processors (or processor cores), cache memory, and one or more of low drop-out voltage regulators (LDOs), interrupt controllers, serial interfaces such as SPI, I²C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 702 may be coupled with or may include memory/storage elements and may be configured to execute instructions stored in the memory/storage to enable various applications or operating systems to run on the infrastructure equipment 700. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 702 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof.

In some implementations, the application circuitry 702 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 702 may comprise logic blocks or logic fabric, and other interconnected resources that may be programmed to perform various functions, such as the procedures, methods, functions, etc. of the various embodiments discussed herein. In such embodiments, the circuitry of application circuitry 702 may include memory cells (e.g., erasable programmable read-only memory (EPROM), electrically erasable programmable read-only memory (EEPROM), flash memory, static memory (e.g., static random access memory (SRAM), antifuses, etc.)) used to store logic blocks, logic fabric, data, etc. in look-up-tables (LUTs) and the like. The baseband circuitry 704 may be implemented, for example, as a solder-down substrate including one or more integrated circuits, a single packaged integrated circuit soldered to a main circuit board or a multi-chip module containing two or more integrated circuits.

The user interface circuitry 718 may include one or more user interfaces designed to enable user interaction with the infrastructure equipment 700 or peripheral component interfaces designed to enable peripheral component interaction with the infrastructure equipment 700. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end module 706 may comprise a millimeter wave (mmWave) radio front end module (RFEM) and one or more sub-mmWave radio frequency integrated circuits (RFICs). In some implementations, the one or more sub-mmWave RFICs may be physically separated from the mm Wave RFEM. The RFICs may include connections to one or more antennas or antenna arrays, and the RFEM may be connected to multiple antennas. In alternative implementations, both mmWave and sub-mmWave radio functions may be implemented in the same physical radio front end module 706, which incorporates both mmWave antennas and sub-mmWave.

The memory circuitry 708 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. The memory circuitry 708 may be implemented as one or more of solder down packaged integrated circuits, socketed memory modules and plug-in memory cards.

The PMIC 710 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 712 may provide for electrical power drawn from a network cable to provide both power supply and data connectivity to the infrastructure equipment 700 using a single cable.

The network controller circuitry 714 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 700 via network interface connector 720 using a physical connection, which may be electrical (commonly referred to as a "copper interconnect"), optical, or wireless. The network controller circuitry 714 may include one or more dedicated processors and/or FPGAs to communicate using one or more of the aforementioned protocols. In some implementations, the network controller circuitry 714 may include multiple controllers to provide connectivity to other networks using the same or different protocols. The positioning circuitry 716 includes circuitry to receive and decode signals transmitted/broadcasted by a positioning network of a global navigation satellite system.

Figure 8:
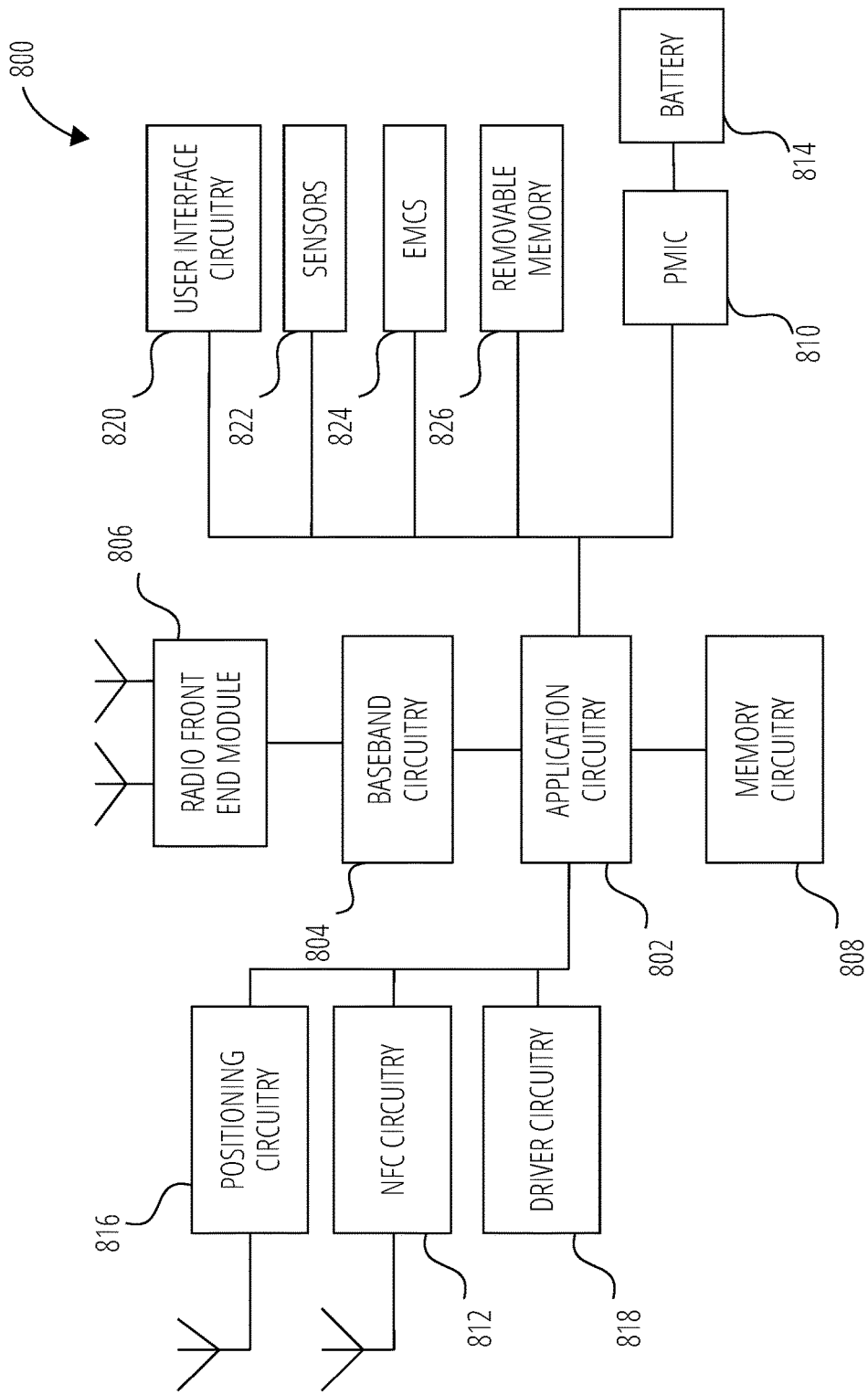
FIG. 8 illustrates a platform in accordance with one embodiment.

FIG. 8 illustrates an example of a platform 800 in accordance with various embodiments. In embodiments, the computer platform 800 may be suitable for use as UEs, application servers, and/or any other element/device discussed herein. The platform 800 may include any combinations of the components shown in the example. The components of platform 800 may be implemented as integrated circuits (ICs), portions thereof, discrete electronic devices, or other modules, logic, hardware, software, firmware, or a combination thereof adapted in the computer platform 800, or as components otherwise incorporated within a chassis of a larger system. The block diagram of FIG. 8 is intended to show a high level view of components of the computer platform 800. However, some of the components shown may be omitted, additional components may be present, and different arrangement of the components shown may occur in other implementations.

Application circuitry 802 includes circuitry such as, but not limited to one or more processors (or processor cores), cache memory, and one or more of LDOs, interrupt controllers, serial interfaces such as SPI, I²C or universal programmable serial interface module, RTC, timer-counters including interval and watchdog timers, general purpose IO, memory card controllers such as SD MMC or similar, USB interfaces, MIPI interfaces, and JTAG test access ports. The processors (or cores) of the application circuitry 802 may be coupled with or may include memory/storage elements and may be configured to execute instructions stored in the memory/storage to enable various applications or operating systems to run on the platform 800. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 802 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some embodiments, the application circuitry 802 may comprise, or may be, a special-purpose processor/controller to operate according to the various embodiments herein.

Additionally or alternatively, application circuitry 802 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 802 may comprise logic blocks or logic fabric, and other interconnected resources that may be programmed to perform various functions, such as the procedures, methods, functions, etc. of the various embodiments discussed herein. In such embodiments, the circuitry of application circuitry 802 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up tables (LUTs) and the like.

The baseband circuitry 804 may be implemented, for example, as a solder-down substrate including one or more integrated circuits, a single packaged integrated circuit soldered to a main circuit board or a multi-chip module containing two or more integrated circuits.

The radio front end module 806 may comprise a millimeter wave (mmWave) radio front end module (RFEM) and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mm Wave radio functions may be implemented in the same physical radio front end module 806, which incorporates both mmWave antennas and sub-mmWave.

The memory circuitry 808 may include any number and type of memory devices used to provide for a given amount of system memory. As examples, the memory circuitry 808 may include one or more of volatile memory including random access memory (RAM), dynamic RAM (DRAM) and/or synchronous dynamic RAM (SD RAM), and non-volatile memory (NVM) including high-speed electrically erasable memory (commonly referred to as Flash memory), phase change random access memory (PRAM), magnetoresistive random access memory (MRAM), etc. The memory circuitry 808 may be developed in accordance with a Joint Electron Devices Engineering Council (JEDEC) low power double data rate (LPDDR)-based design, such as LPDDR2, LPDDR3, LPDDR4, or the like. Memory circuitry 808 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 808 maybe on-die memory or registers associated with the application circuitry 802. To provide for persistent storage of information such as data, applications, operating systems and so forth, memory circuitry 808 may include one or more mass storage devices, which may include, inter alia, a solid state disk drive (SSDD), hard disk drive (HDD), a microHDD, resistance change memories, phase change memories, holographic memories, or chemical memories, among others. For example, the computer platform 800 may incorporate the three-dimensional (3D) cross-point (XPOINT) memories from Intel® and Micron®.

The removable memory 826 may include devices, circuitry,
enclosures/housings, ports or receptacles, etc. used to couple portable data storage devices with the platform 800. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 800 may also include interface circuitry (not shown) that is used to connect external devices with the platform 800. The external devices connected to the platform 800 via the interface circuitry include sensors 822 and electro-mechanical components (shown as EMCs 824), as well as removable memory devices coupled to removable memory 826.

The sensors 822 include devices, modules, or subsystems whose purpose is to detect events or changes in its environment and send the information (sensor data) about the detected events to some other a device, module, subsystem, etc. Examples of such sensors include, inter alia, inertia measurement units (IMUs) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 824 include devices, modules, or subsystems whose purpose is to enable platform 800 to change its state, position, and/or orientation, or move or control a mechanism or (sub)system. Additionally, EMCs 824 may be configured to generate and send messages/signaling to other components of the platform 800 to indicate a current state of the EMCs 824. Examples of the EMCs 824 include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 800 is configured to operate one or more EMCs 824 based on one or more captured events and/or instructions or control signals received from a service provider and/or various clients. In some implementations, the interface circuitry may connect the platform 800 with positioning circuitry 816.

In some implementations, the interface circuitry may connect the platform 800 with Near-Field Communication circuitry (shown as NFC circuitry 812). The NFC circuitry 812 is configured to provide contactless, short-range communications based on radio frequency identification (RFID) standards, wherein magnetic field induction is used to enable communication between NFC circuitry 812 and NFC-enabled devices external to the platform 800 (e.g., an "NFC touchpoint").

The driver circuitry 818 may include software and hardware elements that operate to control particular devices that are embedded in the platform 800, attached to the platform 800, or otherwise communicatively coupled with the platform 800. The driver circuitry 818 may include individual drivers allowing other components of the platform 800 to interact with or control various input/output (I/O) devices that may be present within, or connected to, the platform 800. For example, driver circuitry 818 may include a display driver to control and allow access to a display device, a touchscreen driver to control and allow access to a touchscreen interface of the platform 800, sensor drivers to obtain sensor readings of sensors 822 and control and allow access to sensors 822, EMC drivers to obtain actuator positions of the EMCs 824 and/or control and allow access to the EMCs 824, a camera driver to control and allow access to an embedded image capture device, audio drivers to control and allow access to one or more audio devices.

The power management integrated circuitry (shown as PMIC 810) (also referred to as "power management circuitry") may manage power provided to various components of the platform 800. In particular, with respect to the baseband circuitry 804, the PMIC 810 may control power-source selection, voltage scaling, battery charging, or DC-to-DC conversion. The PMIC 810 may often be included when the platform 800 is capable of being powered by a battery 814, for example, when the device is included in a UE.

In some embodiments, the PMIC 810 may control, or otherwise be part of, various power saving mechanisms of the platform 800. For example, if the platform 800 is in an RRC_Connected state, where it is still connected to the RAN node as it expects to receive traffic shortly, then it may enter a state known as Discontinuous Reception Mode (DRX) after a period of inactivity. During this state, the platform 800 may power down for brief intervals of time and thus save power. If there is no data traffic activity for an extended period of time, then the platform 800 may transition off to an RRC_Idle state, where it disconnects from the network and does not perform operations such as channel quality feedback, handover, etc. The platform 800 goes into a very low power state and it performs paging where again it periodically wakes up to listen to the network and then powers down again. The platform 800 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 814 may power the platform 800, although in some examples the platform 800 may be mounted deployed in a fixed location, and may have a power supply coupled to an electrical grid. The battery 814 may be a lithium ion battery, a metal-air battery, such as a zinc-air battery, an aluminum-air battery, a lithium-air battery, and the like. In some implementations, such as in V2X applications, the battery 814 may be a typical lead-acid automotive battery.

In some implementations, the battery 814 may be a "smart battery," which includes or is coupled with a Battery Management System (BMS) or battery monitoring integrated circuitry. The BMS may be included in the platform 800 to track the state of charge (SoCh) of the battery 814.

A power block, or other power supply coupled to an electrical grid may be coupled with the BMS to charge the battery 814. In some examples, the power block may be replaced with a wireless power receiver to obtain the power wirelessly, for example, through a loop antenna in the computer platform 800. In these examples, a wireless battery charging circuit may be included in the BMS. The specific charging circuits chosen may depend on the size of the battery 814, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 820 includes various input/output (I/O) devices present within, or connected to, the platform 800, and includes one or more user interfaces designed to enable user interaction with the platform 800 and/or peripheral component interfaces designed to enable peripheral component interaction with the platform 800. The user interface circuitry 820 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position(s), or other like information. Output device circuitry may include any number and/or combinations of audio or visual display, including, inter alia, one or more simple visual outputs/indicators such as binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 800. The output device circuitry may also include speakers or other audio emitting devices, printer(s), and/or the like. In some embodiments, the sensors 822 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

Although not shown, the components of platform 800 may communicate with one another using a suitable bus or interconnect (IX) technology, which may include any number of technologies, including ISA, EISA, PCI, PCix, PCie, a Time-Trigger Protocol (TTP) system, a FlexRay system, or any number of other technologies. The bus/IX may be a proprietary bus/IX, for example, used in a SoC based system. Other bus/IX systems may be included, such as an I²C interface, an SPI interface, point-to-point interfaces, and a power bus, among others.

For one or more embodiments, at least one of the components set forth in one or more of the preceding figures may be configured to perform one or more operations, techniques, processes, and/or methods as set forth in the Example Section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLE SECTION

The following examples pertain to further embodiments.

Example 1 is a method for a User Equipment (UE), the method comprising: receiving a system information block (SIB) via radio resource control (RRC) signaling, the SIB comprising a listen before talk (LBT) configuration element, the LBT configuration element including a transmission configuration indicator (TCI) state parameter indicating potential TCI states; receiving a Downlink Control Information (DCI) message, the DCI message indicating an enabled TCI state for a channel occupancy time (COT), the enabled TCI state associated with one of the potential TCI states; decoding the DCI message and determining the enabled TCI state for the COT; and applying the enabled TCI state for the COT as indicated in the DCI message.

Example 2 is the method of Example 1, wherein the LBT configuration element is for a frequency range comprising 52.6 gigahertz (GHz) to 71 GHz.

Example 3 is the method of Example 1, wherein the LBT configuration element includes parameters indicating LBT or no LBT, omni or directional LBT, and LBT beam TCI state information.

Example 4 is the method of Example 3, wherein the LBT beam TCI state information includes maximum number of LBT beams, TCI state ID, QCL type, reference signal association and default LBT beam configuration.

Example 5 is the method of Example 1, wherein the DCI message is a DCI Format 2-0 message.

Example 6 is the method of Example 1, wherein determining the enabled TCI state for the COT comprises determining that the enabled TCI state is omni when there is no bit field in the DCI message associated with the enabled TCI state.

Example 7 is the method of Example 1, wherein the DCI message comprises a bit field a size of a maximum TCI state, wherein the bit field indicates the enabled TCI state.

Example 8 is the method of Example 5, wherein the enabled TCI state is the sensing beam TCI state, and wherein the method further comprises deriving a transmission TCI state of the COT based on an RRC configured sensing beam to transmission beam mapping.

Example 9 is the method of Example 5, wherein the enabled TCI state is the transmission beam TCI state.

Example 10 is the method of Example 1, wherein if both directional LBT and omni LBT are configured in the LBT configuration element of the SIB, the DCI message comprises a bit field one bit larger than a size of a maximum TCI state, wherein if omni sensing is performed before the COT, an omni LBT bit of the bit field is set to one and other directional LBT bits in the bit field are ignored, and wherein if directional sensing is performed before the COT, the omni LBT bit is set to zero and a directional LBT bit corresponding to the directional sensing is set to one.

Example 11 is the method of Example 1, further comprising receiving a medium access control element (MAC CE) that enables an LBT configuration signaled in the SIB.

Example 12 is the method of Example 1, further comprising determining a COT TCI state for multiple component carriers (CCs) by executing a LBT procedure on one CC of the multiple CCs, wherein if CC is clear transmission on all the multiple CCs can proceed, and the DCI message is sent in any of the multiple CCs, wherein the enabled TCI state in the DCI message applies to all of the multiple CCs.

Example 13 is the method of Example 12, wherein when multiple band groups are configured a random CC can be chosen for a band group and if the CC is clear then all CCs within the band group are considered usable for transmission.

Example 14 is the method of Example 1, further comprising determining a COT TCI state for multiple CCs by independently performing LBT procedure on each CC, and wherein the DCI message includes a bit field defining TCI states for each CC.

Example 15 is the method of Example 1, further comprising determining if transmission and reception points of a multiple transmission and reception point enabled system are clear and receiving a TCI state used in LBT sensing for the transmission and reception points.

Example 16 is a method for a network node, the method comprising: transmitting a system information block (SIB) via radio resource control (RRC) signaling, the SIB comprising a listen before talk (LBT) configuration element, the LBT configuration element including a transmission configuration indicator (TCI) state parameter that comprises potential TCI states; configuring a Downlink Control Information (DCI) message comprising an indication of an enabled TCI state for a channel occupancy time (COT) from the potential TCI states; transmitting the DCI message to a UE; and applying the enabled TCI state for the COT as indicated in the DCI message.

Example 17 is the method of Example 16, wherein the LBT configuration element is for a frequency range comprising 52.6 gigahertz (GHz) to 71 GHz.

Example 18 is the method of Example 16, wherein the DCI message is a DCI Format 2-0 message.

Example 19 is the method of Example 16, wherein when the enabled TCI state is omni the network node does not include a bit field associated with the enabled TCI state in the DCI message.

Example 20 is the method of Example 16, wherein the DCI message comprises a bit field a size of a maximum TCI state, wherein the bit field indicates the enabled TCI state.

Example 21 is the method of Example 16, wherein if both directional LBT and omni LBT are configured in the LBT configuration element of the SIB, the DCI message comprises a bit field one bit larger than a size of a maximum TCI state, wherein if omni sensing is performed before the COT, an omni LBT bit of the bit field is set to one and other directional LBT bits in the bit field are ignored, and wherein if directional sensing is performed before the COT, the omni LBT bit is set to zero and a directional LBT bit corresponding to the directional sensing is set to one.

Example 22 is the method of Example 16, further comprising transmitting a medium access control element (MAC CE) that enables an LBT configuration signaled in the SIB.

Example 23 is the method of Example 16, further comprising enabling a COT TCI state for multiple component carriers (CCs) by executing a LBT procedure on one CC of the multiple CCs, wherein if CC is clear transmission on all the multiple CCs can proceed, and the DCI message is sent in any of the multiple CCs, wherein the enabled TCI state in the DCI message applies to all of the multiple CCs.

Example 24 is the method of Example 23, wherein when multiple band groups are configured a random CC can be chosen for a band group and if the CC is clear then all CCs within the band group are considered usable for transmission.

Example 25 is the method of Example 16, further comprising enabling a COT TCI state for multiple CCs by independently performing LBT procedure on each CC, and wherein the DCI message includes a bit field defining TCI states for each CC.

Example 26 is the method of Example 16, wherein the LBT configuration element includes parameters indicating LBT or no LBT, omni or directional LBT, and LBT beam TCI state information.

Example 27 is the method of Example 26, wherein the LBT beam TCI state information includes maximum number of LBT beams, TCI state ID, QCL type, reference signal association and default LBT beam configuration.

Example 28 is the method of Example 16, wherein the enabled TCI state is the sensing beam TCI state, and wherein the method further comprises deriving a transmission TCI state of the COT based on an RRC configured sensing beam to transmission beam mapping.

Example 29 is the method of Example 16, wherein the enabled TCI state is the transmission beam TCI state.

Example 30 is the method of Example 16, further comprising determining if transmission and reception points of a multiple transmission and reception point enabled system are clear and transmitting a TCI state used in LBT sensing for the transmission and reception points.

Example 31 is a method for a User Equipment (UE), the method comprising: transmitting a scheduling request for uplink (UL) dynamic grant (DG); receiving an UL DG DCI; determine if the UL DG DCI comprises a parameter indicating a sensing beam for DG Physical Uplink Shared Channel (PUSCH), wherein if the sensing beam is explicitly indicated, transmitting the DG PUSCH using the indicated beam, and wherein if the sensing beam is not configured in the UL DG DCI, causing an UL channel occupancy time (COT) beam sensing to follow a current active TCI state used in beam management.

Example 32 is a method for a User Equipment (UE), the method comprising: receiving a radio resource control (RRC) configuration message for UL configured grant (CG); decoding the RRC configuration message to determine an enabled TCI state, wherein if the RRC configuration message indicates a directional LBT, performing directional LBT with specific Effective Isotropic Radiated Power (EIRP) and beam direction for the transmission burst, using current active TCI State indicated in the RRC configuration message, and wherein if the RRC configuration message indicates omni LBT, performing omni LBT.

Example 33 is the method of Example 32, further comprising signaling a sensing beam and transmission beam direction via a CG-Uplink Control Information (UCI).

Example 34 is the method of Example 33, wherein the CG-UCI content includes HARQ ID, new data indicator (NDI), redundancy version (RV), and COT sharing information, and wherein the COT sharing information includes COT duration and offset, and a TCI state.

Example 35 may include an apparatus comprising means to perform one or more elements of a method described in or related to any of the above Examples, or any other method or process described herein.

Example 36 may include one or more non-transitory computer-readable media comprising instructions to cause an electronic device, upon execution of the instructions by one or more processors of the electronic device, to perform one or more elements of a method described in or related to any of the above Examples, or any other method or process described herein.

Example 37 may include an apparatus comprising logic, modules, or circuitry to perform one or more elements of a method described in or related to any of the above Examples, or any other method or process described herein.

Example 38 may include a method, technique, or process as described in or related to any of the above Examples, or portions or parts thereof.

Example 39 may include an apparatus comprising: one or more processors and one or more computer-readable media comprising instructions that, when executed by the one or more processors, cause the one or more processors to perform the method, techniques, or process as described in or related to any of the above Examples, or portions thereof.

Example 40 may include a signal as described in or related to any of the above Examples, or portions or parts thereof.

Example 41 may include a datagram, packet, frame, segment, protocol data unit (PDU), or message as described in or related to any of the above Examples, or portions or parts thereof, or otherwise described in the present disclosure.

Example 42 may include a signal encoded with data as described in or related to any of the above Examples, or portions or parts thereof, or otherwise described in the present disclosure.

Example 43 may include a signal encoded with a datagram, packet, frame, segment, PDU, or message as described in or related to any of the above Examples, or portions or parts thereof, or otherwise described in the present disclosure.

Example 44 may include an electromagnetic signal carrying computer-readable instructions, wherein execution of the computer-readable instructions by one or more processors is to cause the one or more processors to perform the method, techniques, or process as described in or related to any of the above Examples, or portions thereof.

Example 45 may include a computer program comprising instructions, wherein execution of the program by a processing element is to cause the processing element to carry out the method, techniques, or process as described in or related to any of the above Examples, or portions thereof.

Example 46 may include a signal in a wireless network as shown and described herein.

Example 47 may include a method of communicating in a wireless network as shown and described herein.

Example 48 may include a system for providing wireless communication as shown and described herein.

Example 49 may include a device for providing wireless communication as shown and described herein.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method for a User Equipment (UE), the method comprising:
   receiving a system information block (SIB) via radio resource control (RRC) signaling, the SIB comprising a listen before talk (LBT) configuration element;
   decoding the SIB to determine the LBT configuration element;
   sensing a channel for availability for transmissions based on the LBT configuration element in the SIB; and
   sending a transmission when the channel is available.

2. The method of claim 1, wherein the LBT configuration element comprises a parameter that indicates that the UE is to apply LBT.

3. The method of claim 1, wherein the LBT configuration element is for a frequency range comprising 52.6 gigahertz (GHz) to 71 GHz.

4. The method of claim 1, further comprising receiving a Downlink Control Information (DCI) message, the DCI message indicating a LBT procedure type.

5. The method of claim 4, wherein sensing the channel for the availability comprises performing a procedure associated with the LBT procedure type.

6. The method of claim 1, wherein the LBT configuration element is configured if LBT applies.

7. A user equipment (UE) comprising:
   a baseband processor;
   a memory storing instructions that, when executed by the baseband processor, configure the UE to:
      receive a system information block (SIB) via radio resource control (RRC) signaling, the SIB comprising a listen before talk (LBT) configuration element;
      decode the SIB to determine the LBT configuration element;
      sense a channel for availability for transmissions based on the LBT configuration element in the SIB; and
      send a transmission when the channel is available.

8. The UE of claim 7, wherein the LBT configuration element comprises a parameter that indicates that the baseband processor for the UE is to apply LBT.

9. The UE of claim 7, wherein the LBT configuration element is for a frequency range comprising 52.6 gigahertz (GHz) to 71 GHz.

10. The UE of claim 7, wherein the instructions further configure the UE to receive a Downlink Control Information (DCI) message, the DCI message indicating a LBT procedure type.

11. The UE of claim 10, wherein the instructions further configure the UE to sense the channel for the availability by performing a procedure associated with the LBT procedure type.

12. The UE of claim 10, wherein the LBT configuration element is configured if LBT applies.

13. A method for a network node, the method comprising:
   configuring a system information block (SIB), the SIB comprising a listen before talk (LBT) configuration element;
   sending the SIB, to a User Equipment (UE), via radio resource control (RRC) signaling;
   receiving a transmission from the UE when a channel is available based on the LBT configuration element in the SIB.

14. The method of claim 13, wherein the LBT configuration element comprises a parameter that indicates that the UE is to apply LBT.

15. The method of claim 13, wherein the LBT configuration element is for a frequency range comprising 52.6 gigahertz (GHz) to 71 GHz.

16. The method of claim 13, further comprising sending a Downlink Control Information (DCI) message, the DCI message indicating a LBT procedure type.

17. The method of claim 16, wherein the LBT configuration element is configured if LBT applies.

* * * * *